United States Patent
Greene

(10) Patent No.: US 6,819,266 B2
(45) Date of Patent: Nov. 16, 2004

(54) SYSTEM AND METHOD FOR REDUCING THE SPEED OF AN AIRCRAFT

(75) Inventor: Randall A. Greene, White Plains, NY (US)

(73) Assignee: Safe Flight Instrument Corporation, White Plains, NY (US)

( * ) Notice: Subject to any disclaimer, the term of this patent is extended or adjusted under 35 U.S.C. 154(b) by 26 days.

(21) Appl. No.: 10/265,385

(22) Filed: Oct. 7, 2002

(65) Prior Publication Data

US 2004/0070521 A1 Apr. 15, 2004

(51) Int. Cl.$^7$ ............................................. G08B 23/00
(52) U.S. Cl. ..................... 340/969; 340/967; 340/970; 244/76 R; 244/180; 244/182; 701/5; 701/8
(58) Field of Search .................. 340/969, 970, 340/967; 244/75 R, 76 R, 180, 175, 177, 181, 182, 183, 184, 185, 186; 701/3, 5, 4, 7, 8, 11

(56) References Cited

U.S. PATENT DOCUMENTS

| | | | | |
|---|---|---|---|---|
| 3,742,325 A | * | 6/1973 | Andresen, Jr. ............... | 318/591 |
| 4,021,009 A | * | 5/1977 | Baker et al. ................. | 244/180 |
| 4,410,948 A | * | 10/1983 | Doniger et al. ............... | 701/99 |
| 4,488,235 A | * | 12/1984 | Miller ........................... | 701/3 |
| 4,609,988 A | * | 9/1986 | Zweifel ......................... | 701/5 |
| 4,633,404 A | * | 12/1986 | Greeson et al. ................ | 701/3 |
| 5,079,711 A | * | 1/1992 | Lambregts et al. ............ | 701/3 |
| 5,739,770 A | * | 4/1998 | Liden .......................... | 340/976 |

\* cited by examiner

Primary Examiner—Nina Tong
(74) Attorney, Agent, or Firm—Dennison, Schultz, Dougherty & MacDonald

(57) ABSTRACT

An aircraft system for reducing the airspeed of an aircraft as it passes through a preselected altitude includes an automatic throttle system including a computer, a device for inputting a preselected altitude and a preselected airspeed into the computer. An altimeter provides the current altitude of the aircraft and an aircraft instrument provides the current air speed and the vertical speed of the aircraft. The computer in response to the current altitude and vertical speed of the aircraft generates a signal to retard the throttles when the current altitude, the current air speed of the aircraft is equal to 2 times the vertical speed plus a preselected altitude.

8 Claims, 2 Drawing Sheets

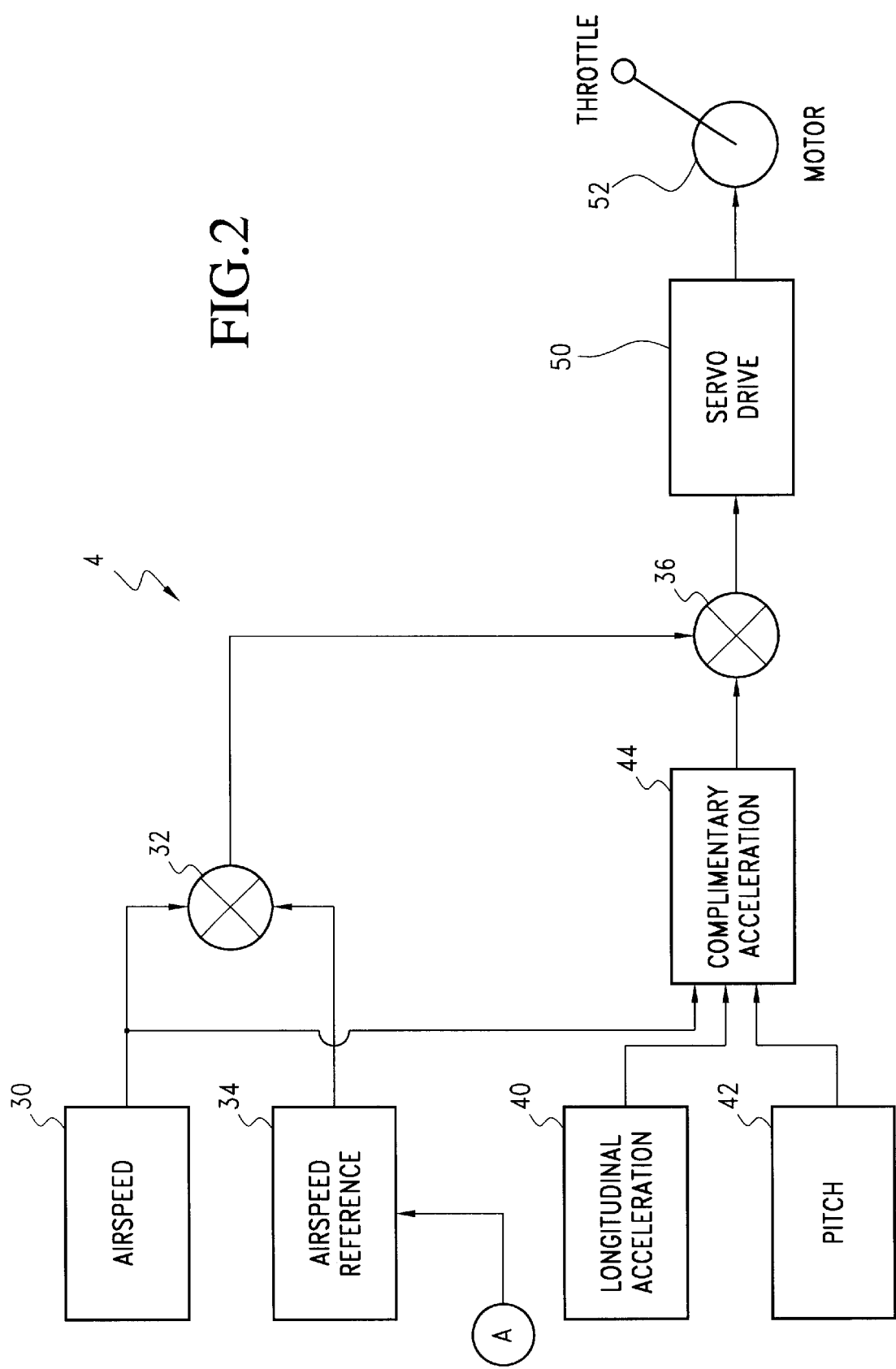

ature of the inventhe invention.

SYSTEM AND METHOD FOR REDUCING THE SPEED OF AN AIRCRAFT

FIELD OF THE INVENTION

This invention relates to an aircraft warning and/or control system and more particularly to a system for warning a pilot or activating an automatic throttle system to decelerate an aircraft as it approaches a preselected altitude.

BACKGROUND OF THE INVENTION

In the United States, the Federal Aviation Administration (FAA) requires that an aircraft's speed be no greater than 250 knots indicated airspeed at altitudes of less than 10,000 feet (MSL). For this reason, a pilot is generally required to decelerate the aircraft as the aircraft descends from a cruise altitude through 10,000 feet and at other times to decelerate an aircraft as it descends in view of the aircraft's structural limitations.

In the prior art, such decelerations were generally accomplished by increasing the pitch attitude of the aircraft in a manner proportional to the difference between the new speed command and the actual speed of the aircraft or speed error. This approach will decelerate the aircraft, however there is no assurance that any altitude restrictions will be met. In other prior art systems, the deceleration of the aircraft in the descent phase is accomplished by the computation of a flight path angle used to manipulate the actual vertical path of the aircraft for the achievement of a specified touch down point. Such systems suffer from relatively long deceleration times beginning at relatively high altitudes above the desired point where the commanded speed is to be achieved. Therefore, the deceleration is not optimal or timely, particularly in the aircraft terminal area where precise and rapid speed control changes are important.

A more recent approach for the automatic deceleration in aircraft during descent is disclosed in the U.S. patent of Greeson et al., U.S. Pat. No. 4,633,404. As disclosed therein a deceleration control apparatus for an aircraft has an automatic altitude capture and hold system and an airspeed hold system, both systems controlled by controlling pitch attitude. During descent from a higher altitude under airspeed-on-pitch control with throttle set at idle thrust, and at some existing negative altitude rate, a slower speed is commanded. A synthetic altitude based on the existing descent rate is computed and the altitude capture and hold system is switched into control in place of the airspeed or pitch control to cause the aircraft to flare toward the synthetic altitude. The resultant loss of airspeed during the altitude capture flare is monitored and when the commanded airspeed reduction is achieved, the airspeed-on-pitch control is resumed.

A further approach to descent guidance by a flight management system is disclosed in the U.S. patent of Liden, U.S. Pat. No. 5,739,770. The Liden system determines the current altitude and a corresponding current horizontal distance of the aircraft from a selected bottom of descent point. A simulation of a basic descent path is performed and a plurality of corresponding altitude and horizontal distance points is stored in a basic descent path array. A horizontal distance is determined from the bottom of descent point array which corresponds to the aircraft altitude. An aircraft symbol is displayed on the navigation display unit to indicate the distance remaining until start of descent.

Notwithstanding the above, it is presently believed that there is a need and a commercial demand for an aircraft warning and control system which is responsive to altitude and vertical speed. It is believed that there is a commercial demand for such systems which will ensure a pilot that the aircraft will descend through a preselected altitude without exceeding a preselected airspeed.

In addition, it is presently believed that the warning and control system in accordance with the present invention can be manufactured and incorporated in an aircraft at a competitive cost, will provide accurate and reliable control of the aircraft and/or warning to a pilot and can be incorporated in a conventional automatic throttle system.

BRIEF SUMMARY OF THE INVENTION

In essence, an aircraft warning and/or control system in accordance with the present invention reduces the airspeed of an aircraft as it passes through a preselected altitude or warns a pilot when it is time to do so. The system includes a computer and means for inputting a first preselected altitude and a preselected speed into the computer. The system also includes means such as a barometric altimeter for determining the current altitude of the aircraft and means for measuring the rate of descent or vertical velocity of the aircraft. Means responsive to the current altitude and rate of descent is provided for generating a signal indicative of the time to reach the preselected altitude and/or to reduce the power of the aircraft to reach the preselected speed at the preselected altitude.

In other words, the system identifies a variable point at which to reduce power in order to reach a predetermined air speed at a preselected altitude. This variable point is a function of vertical speed, the air speed at which the aircraft is flying and the altitude left to reduce the air speed to the preselected airspeed at the preselected altitude. Assuming that the airspeed of the aircraft is to be reduced to 250 knots at 10,000 feet, there will be a different variable point for an aircraft flying at 300 knots and one flying at 400 knots. Similarly, there will be a different variable point for an aircraft that is descending at a rate of 2,000 feet per minute and one that is descending at 1,000 feet per minute.

The invention will now be described in connection with the accompanying drawings.

DESCRIPTION OF THE DRAWINGS

FIG. 2 is a block diagram illustrating an auto throttle system which is used in reducing the airspeed of an aircraft as it approaches a preselected altitude in accordance with the present invention.

DETAILED DESCRIPTION OF THE PREFERRED EMBODIMENTS OF THE INVENTION

Figure 1:
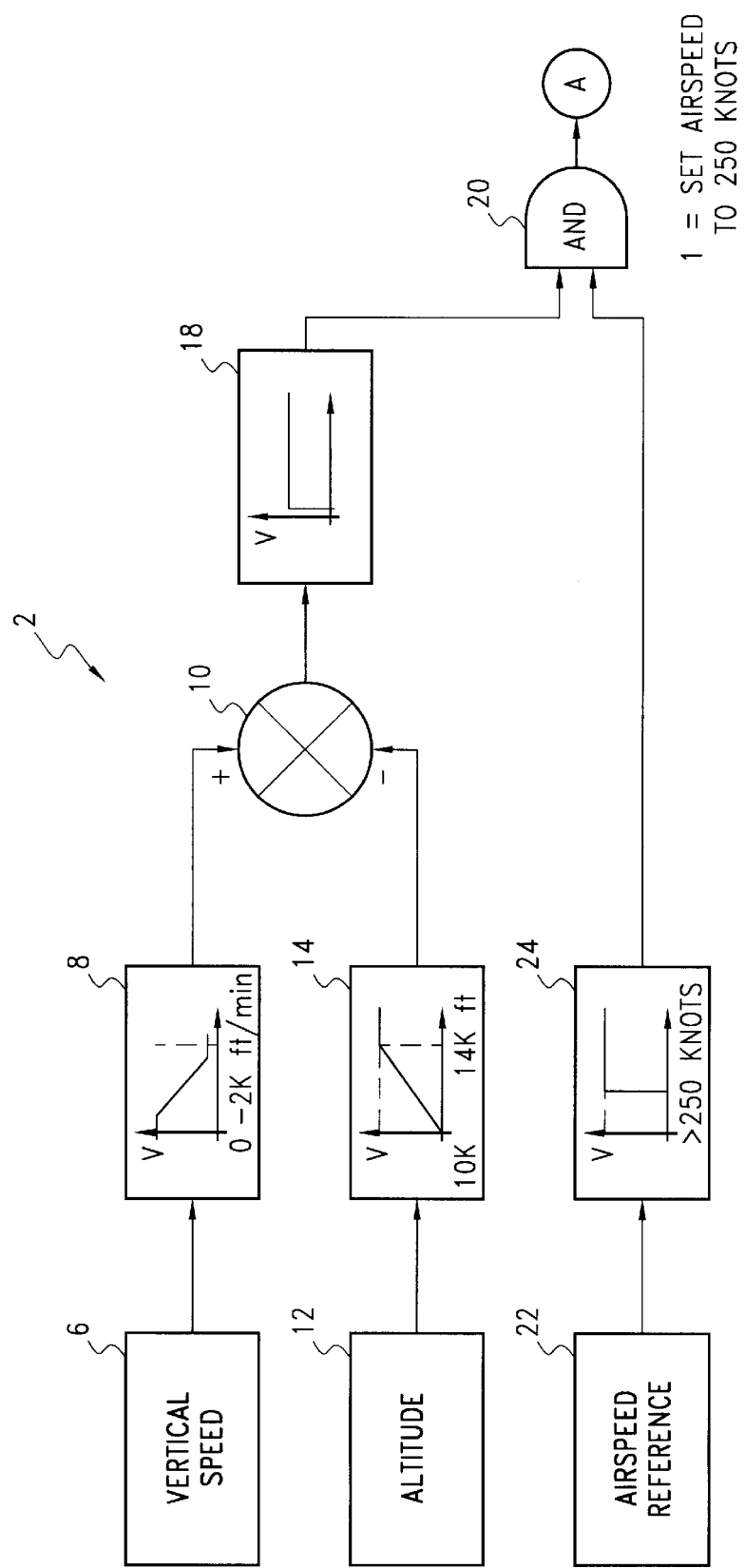
FIG. 1 is a block diagram which illustrates a system for reducing the airspeed of an aircraft as it approaches a preselected altitude in accordance with a preferred embodiment of the invention.

A system in accordance with a preferred embodiment of the invention will now be described in connection with FIGS. 1 and 2.

In essence, the system is used in connection with an auto throttle system 4 (FIG. 2) which is illustrated by a block diagram in FIG. 2. For example, when the aircraft is descending between 14,000 feet and 10,000 feet, the airspeed reference used by the auto throttle system is subject to change if it is set above 250 knots by a speed reference reset portion 2 of the system (FIG. 1). Therefore, at a rate of descent of 2,000 feet per minute, the reference airspeed would be reset to 250 knots when the aircraft descends through 14,000 feet. Then when the rate of descent is less than 2,000 feet per minute, the altitude at which the airspeed is reset to 250 knots would be linear with the rate of descent.

As shown more clearly in FIG. 1, a vertical speed signal or voltage output is produced by a conventional rate of descent instrument 6 or by an air data computer which is indicative of the rate of descent in excess of 0 and up to about 2,000 feet per minute. As long as the rate of descent is above 0 and up to about 2,000 feet per minute, the output of the amplifier/limiter 8 is positive and the positive voltage is fed to a summing junction 10.

An altimeter 12 produces a signal indicative of the altitude of the aircraft which is fed to a amplifier/limiter 14. The switch 14 generates a signal when the aircraft is below a preselected altitude, as for example, between about 10,000 feet and 14,000 feet which is subtracted in a summing junction 10. As long as the voltage or signal from junction 10 is positive, the signal is fed through a switch 18 and the output fed to an AND gate 20.

An airspeed reference signal, as for example 250 knots, is fed through a comparator 24 when the airspeed is in excess of 250 knots i.e., a signal or voltage is fed to the AND gate 20. The AND gate 20 produces a signal when the airspeed of the aircraft is in excess of 250 knots and the aircraft is between preselected altitudes, as for example, between 10,000 feet and 14,000 feet. The signal passing the AND gate 20 is then fed to an auto throttle system input A or warning system (not shown) to alert a pilot to reduce the thrust and thereby reduces the airspeed of the aircraft to 250 knots as required by the FAA.

An auto throttle system for use with the present invention may be of a conventional design such as a Safe Flight AutoPower® airspeed select system. Such systems include four main components; an autopower computer, a clutch pack, a set of yoke-mounted increase/decrease switches, and a digital I.A.S. target display. An autopower engine switch, cockpit annunciator and circuit breakers are also provided. The autopower computer contains the electronics necessary for the operation of the system while the clutch pack contains one clutch per throttle and a servo drive motor assembly for each engine.

The operation of the auto throttle system 4 in connection with the present invention will be described in connection with FIG. 2. As illustrated therein, an airspeed indicator 30 of a conventional design generates a signal indicative of the airspeed of the aircraft and feeds the signal to a summing circuit 32. An airspeed reference signal is input into the computer input 34 and this signal is feed to the summing circuit 32. However, when the aircraft is between 10,000 feet and 14,000 feet altitude and the airspeed is above 250 knots, a signal from input A changes the airspeed reference to 250 knots. The resulting signal is then fed to a summing circuit 32 and the resulting signal is fed to a further summing junction 36.

A longitudinal accelerometer 40 produces a signal which is combined with a signal from a pitch indicator 42 and the airspeed indicator 30 to produce a complimentary acceleration signal as indicated by a box 44.

The complimentary acceleration signal is fed to the summing junction 36 which feeds an output signal for a servo drive 50. The servo-drive 50 then activates a motor 52 to retard the throttle to reduce the thrust until the airspeed of the aircraft is reduced to 250 knots as it passes through 10,000 feet altitude. Thus, a system in accordance with the present invention will produce a signal and retard the thrust of the aircraft at 14,000 feet when the rate of descent of the aircraft is 2,000 feet per minute. However, if the aircraft is descending at a rate of 1,000 feet per minute, a warning or signal are command to an auto throttle to reduce thrust will be given at 12,000 feet. In this way the airspeed of the aircraft is reduced to 250 knots as the aircraft descends through 10,000 feet.

While the invention has been described in connection with its preferred embodiment, it should be recognized and understood that changes and modifications can be made therein without departing from the scope of the appended claims.

What is claimed is:

1. An aircraft system for reducing the airspeed of an aircraft as it passes through a preselected altitude said system comprising:

a computer and means for inputting a first preselected altitude and a preselected airspeed into said computer;

means for determining a current altitude of the aircraft;

means for measuring the current airspeed of the aircraft;

means for measuring the vertical speed of the aircraft; and, means responsive to the current altitude, airspeed and vertical speed of the aircraft to generate a signal to reduce the power of the aircraft to reach the preselected speed at the preselected altitude and in which said means responsive to the current altitude and vertical speed of an aircraft is a program based on the formula $h_2 = mx + h_1$ wherein $h_2$ is the current altitude, and x is the number of feet per minute of vertical speed and $h_1$ is the preselected altitude for speed reduction, and m is the conversion factor from feet per minute to feet.

2. An aircraft system for reducing the speed of an aircraft as it passes through a preselected altitude according to claim 1, wherein $h_1$ is equal to 10,000 feet.

3. An aircraft system for reducing the speed of an aircraft as it passes through a preselected altitude according to claim 2, in which said means for determining the current altitude of the aircraft is a barometric altimeter.

4. An aircraft system for reducing the speed of an aircraft as it passes through a preselected altitude according to claim 2, in which said auto throttle control includes a servo motor for reducing engine thrust to thereby reduce the speed of the aircraft.

5. An aircraft system for reducing the speed of an aircraft as it passes through a preselected altitude according to claim 1, which includes an auto power control for automatically controlling the thrust of an aircraft's engine and which includes means for automatically reducing the power of the aircraft's engines in response to a signal generated by said means responsive to the current altitude and vertical speed of the aircraft.

6. An aircraft system for reducing the speed of an aircraft as it passes through a preselected altitude according to claim 1, which includes means for warning a pilot to retard the throttles to reduce the airspeed of the aircraft to 250 knots per hour at 10,000 feet.

7. An aircraft system for reducing the speed of an aircraft as it passes through a preselected altitude according to claim 6, in which said means for measuring the vertical speed of the aircraft is a barometric altimeter and vertical accelerometer.

8. A method for reducing the airspeed of an aircraft as it passes through a preselected altitude which includes the steps of:

providing an auto throttle system including a computer;

inputting a first preselected altitude and a preselected airspeed into the computer;

determining a current altitude of the aircraft;

determining the vertical speed of descent of the aircraft;

generating a signal responsive to the current altitude and vertical speed of the aircraft indicative of the time to reach the preselected speed at the preselected altitude; and, retarding the throttles to reach the preselected airspeed at the preselected altitude and which includes the step of calculating the altitude at which to retard the throttles from the formula $h_2 = mx + h_1$ wherein $h_2$ is the current altitude, and x is the number of feet per minute of vertical velocity and m is the conversion factor from feet per minute to feet and $h_1$ is 10,000 feet.

* * * * *